United States Patent
Wong et al.

(10) Patent No.: US 8,438,606 B2
(45) Date of Patent: May 7, 2013

(54) SERVING FROM A THIRD PARTY SERVER TO A CONTROL DEVICE A WEB PAGE USEFUL FOR CONTROLLING AN IPTV CLIENT WITH NON-PUBLIC ADDRESS

(75) Inventors: Ling Jun Wong, Escondido, CA (US); True Xiong, San Diego, CA (US)

(73) Assignee: Sony Corporation, Tokyo (JP)

( * ) Notice: Subject to any disclaimer, the term of this patent is extended or adjusted under 35 U.S.C. 154(b) by 287 days.

(21) Appl. No.: 12/839,605

(22) Filed: Jul. 20, 2010

(65) Prior Publication Data
US 2012/0023532 A1   Jan. 26, 2012

(51) Int. Cl.
*H04N 7/16* (2011.01)
*H04N 7/18* (2006.01)

(52) U.S. Cl.
USPC ............... 725/109; 725/110; 725/74

(58) Field of Classification Search .................. None
See application file for complete search history.

(56) References Cited

U.S. PATENT DOCUMENTS

| 6,678,737 | B1 | 1/2004 | Bucher |
| 2005/0138546 | A1* | 6/2005 | AbiEzzi .................... 715/513 |
| 2008/0040767 | A1* | 2/2008 | McCarthy et al. ............ 725/132 |
| 2008/0270571 | A1 | 10/2008 | Walker et al. |
| 2010/0186057 | A1* | 7/2010 | Hardacker et al. ............ 725/110 |
| 2011/0088070 | A1* | 4/2011 | Pham et al. .................... 725/109 |

FOREIGN PATENT DOCUMENTS

JP   2006221419   8/2006

* cited by examiner

*Primary Examiner* — Brian Pendleton
*Assistant Examiner* — Jean D Saint Cyr
(74) *Attorney, Agent, or Firm* — John L. Rogitz

(57) ABSTRACT

An IPTV may be controlled in part by a second user consumer electronic (CE) device using a web page served from a third party server even though the third party server cannot function as a proxy to the IPTV.

20 Claims, 3 Drawing Sheets

Web Application Selection User Interface example use #1 example
use #2 example
use #3 search results
User Interface
from Figure 6

SERVING FROM A THIRD PARTY SERVER TO A CONTROL DEVICE A WEB PAGE USEFUL FOR CONTROLLING AN IPTV CLIENT WITH NON-PUBLIC ADDRESS

FIELD OF THE INVENTION

The present application relates generally to serving web pages from a third party server to a control device to enable the control device to control a local server, such as an IPTV, that does not have a public address.

BACKGROUND OF THE INVENTION

Internet access through TVs is typically provided by essentially programming the TV (often referred to as an Internet Protocol TV, or IPTV) as though it were a computer executing a browser. Such Internet access is thus uncontrolled except as a firewall or filtering program might block certain sites.

As understood herein, uncontrolled Internet access may not be desirable in the context of a TV. A firewall or filtering program may not always be installed on the TV and even when one is installed, access remains much more uncontrolled than conventional TV programming traditionally has expected. Also, a locally installed filter can be unloaded or defeated by a user.

Accordingly, uncontrolled Internet access has several drawbacks. From a viewer's standpoint, exposure to inappropriate subject matter particularly when young viewers are watching is one concern; a much lower threshold of quality screening is another. That is, while many TV shows might not be widely considered as "quality" shows, nonetheless a TV program is usually much more selectively screened than, say, an Internet video. The expectations of TV viewers for such higher level quality screening as a consequence cannot be met by simply providing unfettered Internet access through the TV. Furthermore, TV-related entities, from content providers, manufacturers, and carriers, in most cases derive no benefit from the extension of TV to the Internet, such as, e.g., might be derived, as understood herein, by pay-per-view based on one or more options.

As further recognized herein, it may be desirable to control an IPTV client with a second, control device that might have more convenient user input devices than the IPTV, or for other reasons. Present principles understand that such control may be effected by means of web pages, but as also recognized herein it would be desirable to serve such web pages from a third party Internet server, to avoid filling up storage in the IPTV and further to yield flexibility and robustness in being able to update web pages tailored for a variety of models without having to modify the software of the IPTV.

As still further recognized herein, however, an IPTV or other home server for which control is sought using a web page sourced from another server might not be publicly accessible on the Internet, or might not have a publicly known address even if it is. This raises a cross domain issue, which arises from a restriction which browsers impose to protect users from unauthorized usage of confidential information. Essentially, for security reasons hypertext transfer protocol (HTTP) requests from a client can only be made to the server that serves up the page to the client, and not to a different server on a different domain. On the Internet, this is resolved by using the server as a proxy to convey information to the intended third party server, but as mentioned above, if the third party resides on a home network with a network address that is not available to the proxy, this method is no longer applicable, because the proxy server on the internet has no way of contacting a server that is on a home network.

SUMMARY OF THE INVENTION

Accordingly, a webpage that is hosted by an external server nevertheless can perform AJAX (asynchronous JavaScript and XML) calls (and the like, such as AJAJ) to local servers that reside only on the home network using present principles. Specifically, a control device accessing the web page from the local server can send AJAX and AJAJ calls to the local server.

With the above in mind, a home server (which may be embodied by an IPTV) includes a housing, a display on the housing, and a network interface. A processor in the housing controls the display and communicates with the Internet through the network interface. An input device communicates with the processor which executes logic including presenting a web application selection user interface (UI) and receiving a selection of a web application from the UI. Responsive to the selection, the processor sends a request for a web page over the Internet to an Internet server, receiving the web page from the Internet server in response. The processor then sends, over a home network, the web page to a control device including a processor, display, and user input device such that the control device can display the web page to input commands to the home server.

The request for a web page may identify a type and/or model number of the control device, and the web page can be tailored to the type and/or model number. The web application selection UI may be presented on the display of the home server. In some examples, the web page presents an image of a virtual remote control (RC) including images of RC keys that can be selected to send a command to the home server to control the home server. The command in this example is configured in an infrared communication protocol. In other examples, the web page presents entry fields for accounting information to conduct a monetary transaction for audio video content. In yet other examples, the web page presents a search entry field into which non-Arabic characters are imputable to cause the home server to search for content.

In another aspect, a system includes a home server, a control consumer electronic (CE) device, and a third party server communicating with the home server over the Internet. The control CE device controls the home server using a web page served from the third party server on the home server even though the third party server cannot function as a proxy to the home server.

In another aspect, a server assembly includes a processor, a network interface communicating with the processor to establish communication between the processor and a wide area network, and a computer readable storage medium accessible to the processor and bearing logic. The logic causes the processor to receive a request for a web page from a control device and then request over the Internet the web page from a server on the Internet. The server assembly receives the web page over the Internet and serves the web page to the control device as though the server assembly originated the web page.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
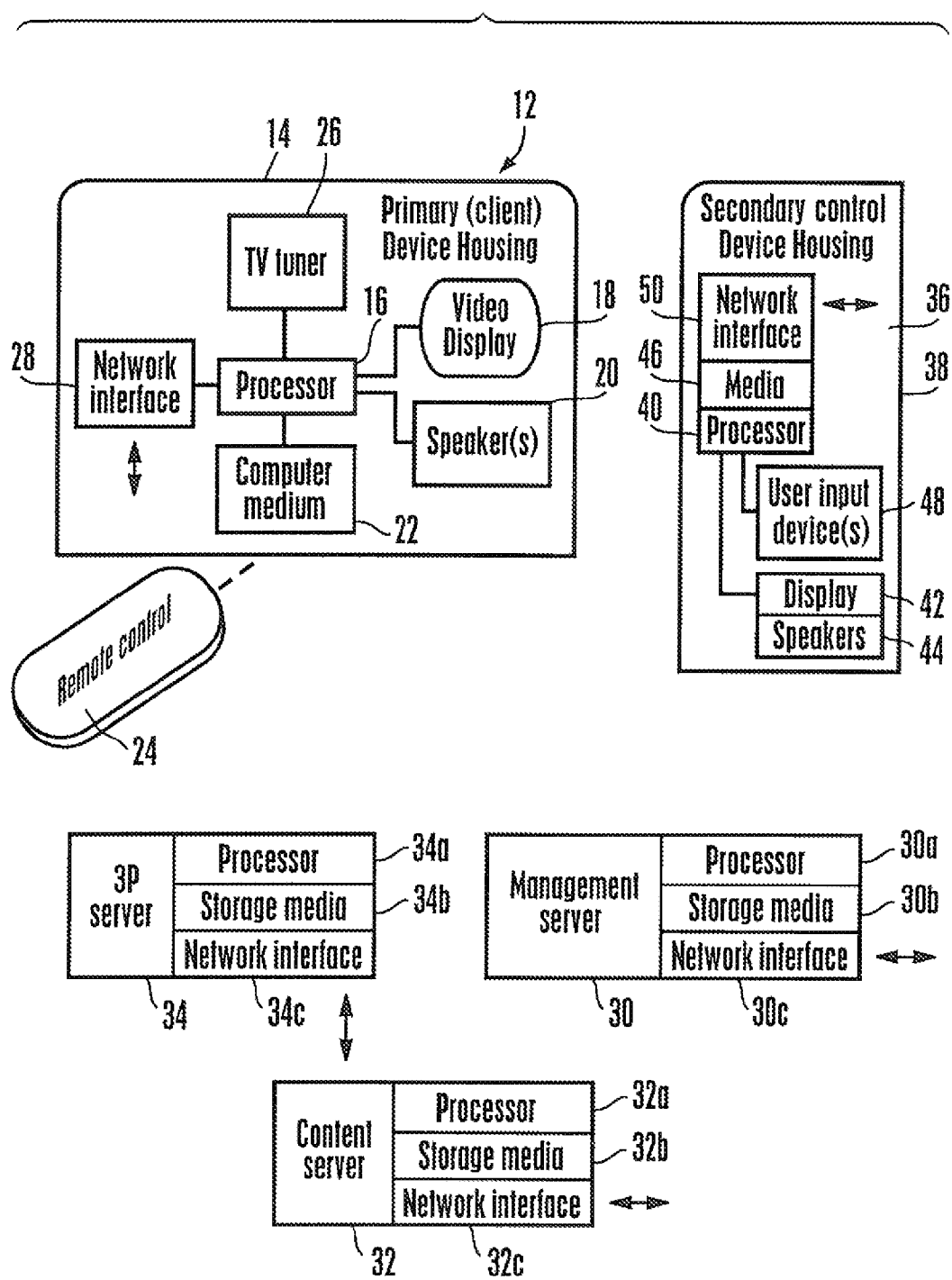
FIG. 1 is a block diagram of an example system in accordance with present principles.

Referring initially to FIG. 1, a client home server device 12 such as a TV, game player, video disk player, camera, digital clock radio, mobile telephone, personal digital assistant, laptop computer, etc. includes a portable lightweight plastic housing 14 bearing a digital processor 16. The processor 16 can control a visual display 18 and an audible display 20 such as one or more speakers. For disclosure purposes, the home server device 12 in one example can be an Internet Protocol TV (IPTV) and may be referred to as such below without loss of generality.

To undertake present principles, the processor 16 may access one or more computer readable storage media 22 such as but not limited to RAM-based storage (e.g., a chip implementing dynamic random access memory (DRAM)) or flash memory or disk-based-storage. Software code implementing present logic executable by the CE device 12 may also be stored on one of the memories shown to undertake present principles.

The processor 16 can receive user input signals from various input devices including a remote control device 24, a point and click device such as a mouse, a keypad, etc. A TV tuner 26 may be provided in some implementations particularly when the CE device is embodied by a TV to receive TV signals from a source such as a set-top box, satellite receiver, cable head end, terrestrial TV signal antenna, etc. Signals from the tuner 26 are sent to the processor 16 for presentation on the display 18 and speakers 20.

As shown in FIG. 1, a network interface 28 such as a wired or wireless modem or wireless telephony transceiver communicates with the processor 16 to provide connectivity to a wide area network such as the Internet. Double arrows in FIG. 1 indicate network communication between components over wired and/or wireless links. In this way, the client device 12 can communicate with a management server 30 on the Internet and with one or more content servers 32, also on the Internet and communicating with the management server 30. Also on the Internet is a third party server 34 which can serve Web pages. Note that "third party" is a term generally denoting an entity apart from the IPTV 12 and control device described below, and does not necessarily connote anything about respective ownership of the various components.

The servers 30, 32, 34 have respective processors 30a, 32a, 34a accessing respective non-transitory computer readable storage media 30b, 32b, 34b which may be, without limitation, disk-based and/or solid state storage. The servers communicate with a wide area network such as the Internet via respective network interfaces 30c, 32c, 34c. It is to be understood in view of disclosure below that the home server device 12 particularly when implemented by a non-PC device such as a TV or game console or camera can communicate only with the management server 30 and with content servers 32 that appear on a service list provided to the processor 16 by the management server 30, with the service list not being modifiable by the processor 16.

A second or control CE device 36 with housing 38 such as another TV, game player, video disk player, camera, digital clock radio, mobile telephone, personal digital assistant, laptop computer, etc. bears a digital processor 40 controlling a visual display 42 and an audible display 44 such as one or more speakers. To undertake present principles, the second or control processor 40 may access one or more computer readable storage media 46 such as but not limited to RAM-based storage (e.g., a chip implementing dynamic random access memory (DRAM)) or flash memory or disk-based-storage. Software code implementing present logic executable by the second or control device 36 may also be stored on one of the memories shown to undertake present principles. Further, the second or control processor 40 can receive user: input signals from various input devices 48 including a point and click device such as a mouse, a keypad, etc. A network interface 50 such as a wired or wireless modem or wireless telephony transceiver communicates with the processor 40 to provide connectivity to a wide area network such as the Internet.

Figure 2:
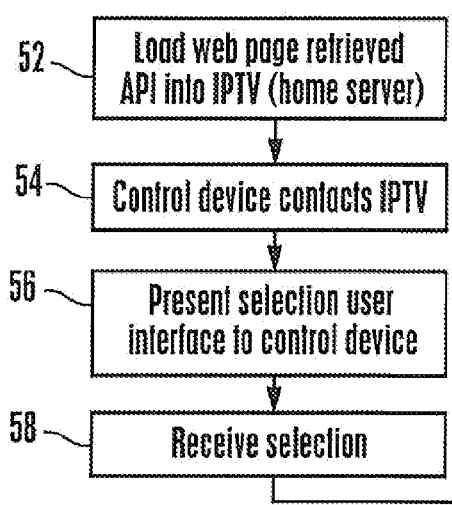
FIG. 2 is a flow chart of example logic according to present principles.
Figure 2:
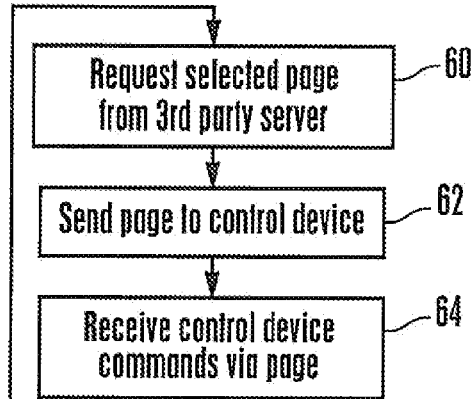
Figure 3:
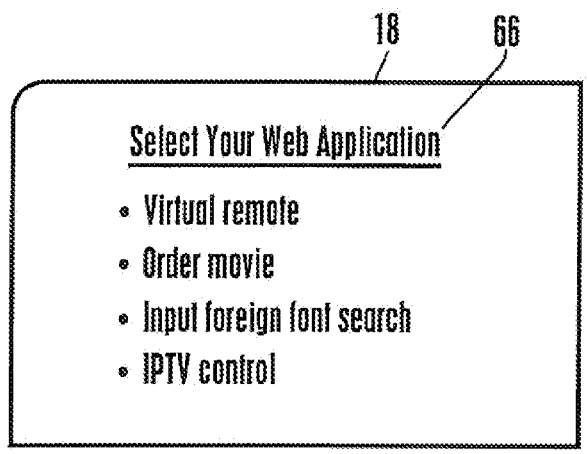
FIG. 3 is a screen shot of a web application user interface (UI) that can be presented on the home server (IPTV)

FIG. 2 shows example logic that may be executed by processors within the system of FIG. 1. Commencing at block 52, a web page retrieval application programming interface (API) is loaded into the home server 12 (IPTV, in one example) for presentation thereof on the display 18 as shown in FIG. 3 and discussed further below. At block 54, the control device 36 establishes wired or wireless communication with the IPTV and from, e.g., a menu on the IPTV invokes presentation of the web application UI at block 56. The UI is presented, listing available applications, and at block 58 a selection of one of the applications is received by the IPTV. Note that in executing the logic thus far a viewer may use the control device 36 or the RC 24, since at this point the logic seeks to command the IPTV to retrieve a desired web page from the third party server 34.

However, regardless of what mode of command is used, it is to be understood that information identifying the model number and type of the control device 36 is sent to the IPTV. In this way, a web page tailored for that particular type of control device may be retrieved from the third party server. Accordingly, when the control device 36 is used in the logic of blocks 54-58, the control device 36 can be automatically programmed to send its identifying information to the IPTV as part of the selection at block 58. On the other hand, if the RC 24 is used, the IPTV can be programmed to prompt on its display 18 for the viewer to enter, by means of the keys on the RC 24, the identifying information of the control device 36.

At block 60, the home server 12 (IPTV) sends a request to the third party server 34 for the selected web application as embodied in a web page served from the server 34. This request can include the information identifying the type/model number etc. of the control device 36, as well as, if desired, the type/model number of the IPTV. With this information, the third party server 34 can return a version of the web page that is tailored for one or both the IPTV and the control device 36. It will accordingly be appreciated that the server 34, with its greater capacity for storage and processing, may store multiple versions of a web page for service to multiple different control devices and/or home servers while facilitating modifications to the web pages that in essence are propagated globally simply by changing them at the server 34, instead of having to update every home server in the IPTV system with an updated page were the home servers tasked with storing and managing the web pages.

In response to its request, the home server 12 receives the web page from the third party server 34. Then, at block 62 the home server 12 sends the web page to the control device 36, identifying itself (the home server) as the web page sender to indicate to the browser of the control device that the home server and not the third party server is sourcing the web page. Commands from the control device 36, entered by means of the web page, consequently are returned to the homer server where they are received by the home server 12 at block 64, with the above-noted cross-domain problem having been solved by serving the page from the home server, so that the browser of the control device 36 encounters no security barriers to responding back to the serving IPTV. The commands may be in the form of AJAX/AJAJ calls.

The logic above thus describes a way of serving a web page from a third party server 34 on the Internet and having that web page, under control of the control device 36, subsequently communicate with the home server 12 (IPTV).

Described differently, if the control device 36 is designated "A", the home server 12 (IPTV) is designated "B", and the third party server 34 designated "C", then in the logic above, "A" must get a web page stored at "C", but this web page principally communicates with "B" which must request it. Accordingly, to get the web page from "C", "A" gets it from "B" which gets it from "C", i.e., A->B->C->B->A. Subsequent hypertext transfer protocol (HTTP) calls involving the web page are "A" to "B" to "A", i.e., A->B->A.

Thus, in the logic of FIG. 2, the call to the third party server 34 is made to load the web page, whereas in conventional Internet proxy sourcing the call to the third party server is made after the page is already loaded.

Present principles permit the home server (IPTV) to respond to the request from the control device 36 while leaving the flexibility of UI changes to the third party server host on the Internet. Consequently, the web page can be frequently improved, and not have any impact on the TV's software code. The IPTV merely serves up the web page directed by the control device to the control device. This also gives the control device the flexibility of getting the desired web page, and not be restricted to the any one that the IPTV offers were the web page to originate at the IPTV and not the third party server host. As intimated above, different implementations of the IPTV API can exist on ten different hosts, and the client operating the control device 36 can choose to use the implementation on any of the ten hosts to communicate with the IPTV.

Recall that at block 58, using an API on the home server, the control device 36 requests a third party webpage. In a non-limiting manner, such an API call may be formatted as follows: http://<ip & port of homeserver>/getWebpage.php?url=www.google.com/TVcontrols.html. When such a request is made to the home server, the home server downloads the web page stated by the uniform resource locator (URL) and returns it to the control device, making the home server 12 appear to be the host of that web page and hence resolving the cross domain issue of browsers because browsers allow HTTP calls within the web page to be made to the server that serves up the page.

FIG. 3 shows an example web page retrieval UI that can be presented at block 56 of FIG. 2 on the display 18 of the IPTV. As shown, a list of web applications corresponding to web pages is presented, and one may be selected from the list. FIGS. 4-7 illustrate various non-limiting examples of web pages that can be selected from the list on the IPTV display 18 for presentation on the control device display 42.

Figure 4:
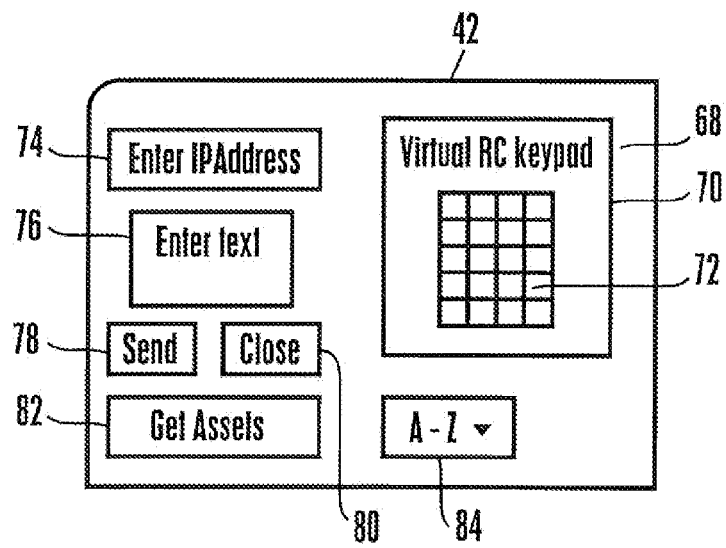
FIGS. 4-7 are screen shots of example web applications that can be returned to the control device.

Specifically and now referring to FIG. 4, responsive to a selection to present an image of a virtual RC at block 58, a virtual RC UI 68 is obtained as described above by the IPTV from the third party server 34 and served by the IPTV to the control device 36. In the example shown, the UI 68 can include an image 70 of a RC keypad with images 72 of RC keys that may be selected by means of the control device input device 48. When a virtual RC key is selected, a code mimicking the code that would generated by a RC is sent to the IPTV.

For example, a signal in Sony Infrared Remote Control System (SIRCS) protocol may be sent from the control device 36 to the IPTV responsive to selection of an image 70 of the virtual RC keypad 68, although the signal itself need not be physically in the infrared spectrum. In this way, the TV recognizes the code since it is already programmed to recognize IR codes from physical RCs. The commands input to the IPTV using the virtual RC may be, without limitation, channel up/down, volume up/down, channel skip, tune to last channel, stop, play, pause, fast forward, reverse, skip chapter, etc.

Also, entry windows 74, 76 may be presented in the UI 68 into which a viewer may enter, respectively, an IP address for the IPTV to access, and text to command the IPTV, using the control device input device 48. Send and close buttons 78, 80 may be presented on the UI 68 to send the text in the window 76 and close the UI, respectively. Also, a get assets button 82 may be provided which, when selected, commands the IPTV to obtain a list of assets from one of the content servers 32. A sort selector button 84 can also be provided to sort the assets in plural user-defined ways, e.g., alphabetically, reverse alphabetically, etc.

Figure 5:
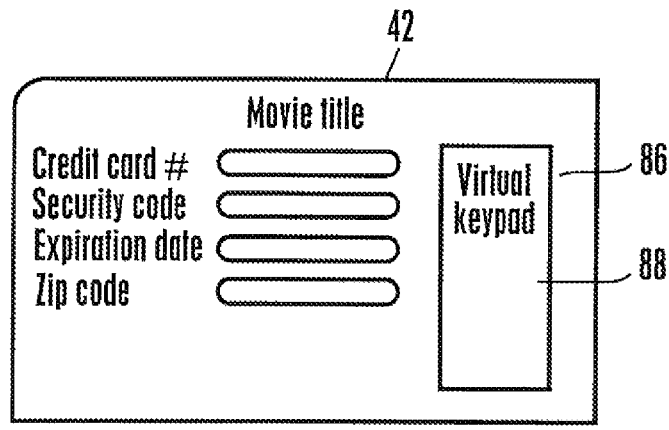

FIG. 5 shows another web page 86 that can be selected at block 58 of FIG. 2 to order a movie. The web page 86 includes the name of the movie being ordered along with fields for entering accounting data, typically credit card information, with which to purchase the movie. A virtual keypad 88 may also be presented on the web page 86. The viewer can enter the appropriate purchase information and send it to the IPTV for causing the IPTV to download the movie from, e.g., a content server 32 and to upload the billing information thereto to generate a bill to the user's account.

Figure 6:
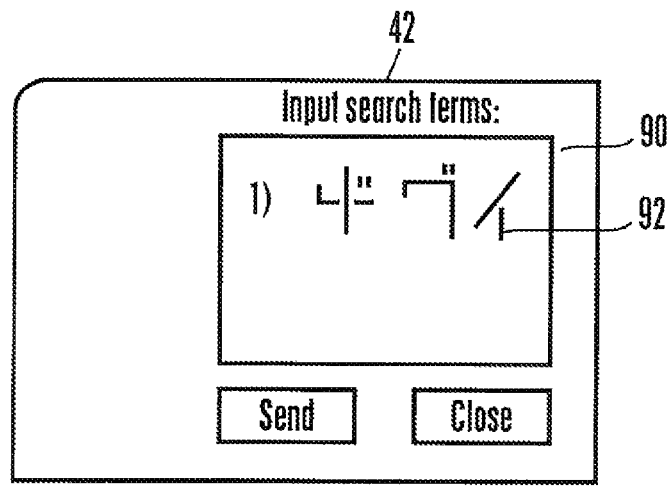

In FIG. 6, a user of a control device 36 having non-Arabic letter keys may wish to input a search term in other than the Arabic alphabet for a movie. The web page UI 90 of FIG. 6 may be selected by the control device 36 and obtained by the IPTV from the third party server 34 for service to the control device 36 by the IPTV as described above. Non-Arabic letters 92 (in this case, Japanese font) can be input to search for a movie, e.g., "Spiderman". Send and close buttons can be provided to send the search terms to the IPTV and close the UI 90, respectively.

Figure 7:
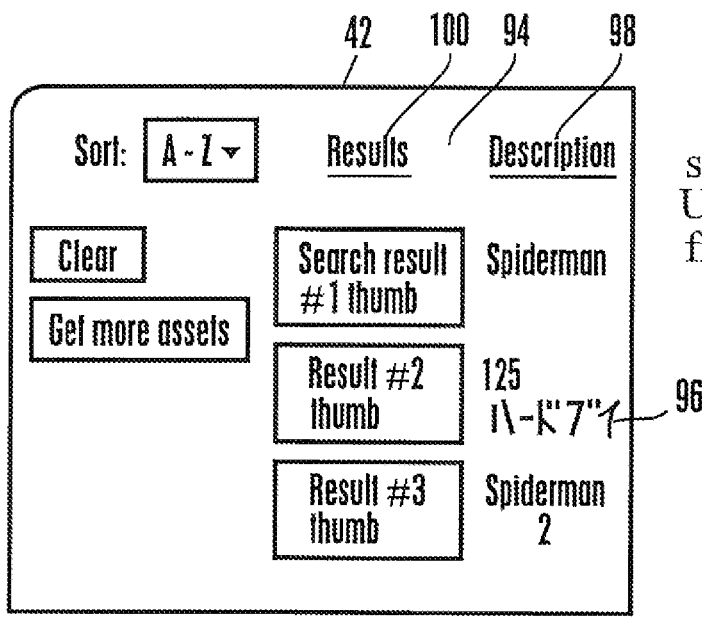

The IPTV then executes the search to download results from, e.g., the content serves 32. Although the results presented on the IPTV display 18 may contain only boxes instead of the non-Arabic characters establishing the search terms because, e.g., the IPTV may not have the capability to display non-Arabic fonts, as shown in FIG. 7 a UI 94 presenting on the control device display 42 the search results may indeed display non-Arabic characters 96 in a description column 98 corresponding to results thumbnails in a results column 100. Sort, clear, and get more assets buttons may also be provided in the UI 94.

While the particular SERVING FROM A THIRD PARTY SERVER TO A CONTROL DEVICE A WEB PAGE USEFUL FOR CONTROLLING AN IPTV CLIENT WITH NON-PUBLIC ADDRESS is herein shown and described in detail, it is to be understood that the subject matter which is encompassed by the present invention is limited only by the claims.

What is claimed is:

1. Home server comprising: housing; display on the housing;
   network interface; processor in the housing controlling the display and communicating with the Internet through the network interface; input device communicating with the processor; the processor executing logic including:

presenting a web application selection user interface (UI) on a display; receiving a selection of a web application from the UI; responsive to the selection, sending a request for a web page over the Internet to an Internet content server; wherein the request includes information identifying the type and model number of control device requesting the web page; receiving the web page from the internet content server;

sending, over a home network, the web page to a control device including a processor, display, and user input device such that the control device can display the web page to input commands to the home server, identifying itself as a web page sender to indicate to the control device that the server assembly and not the third party server is sourcing the web page, commands from the control device entered by means of the web page being returned to the server assembly such that cross-domain problems are avoided by serving the web page from the server assembly such that the control device encounters no security barriers to responding back to the server assembly, calls to the third party server being made to load the web page, in contrast to calling the third party server after the web page is already loaded; wherein the processor communicates on the Internet only with a management server and with content servers that appear on a service list provided to the processor by the management server, with the service list not being modifiable by the processor.

2. The server of claim 1, wherein the request for a web page identifies a type and/or model number of the control device, and the web page is tailored to the type and/or model number.

3. The server of claim 1, wherein the web application selection UI is presented on a display of the home server.

4. The server of claim 1, wherein the web page presents an image of a virtual remote control (RC) including images of RC keys that can be selected to send a command to the home server to control the home server.

5. The server of claim 4, wherein the command is configured in an infrared communication protocol.

6. The server of claim 1, wherein the web page presents entry fields for accounting information to conduct a monetary transaction for audio video content.

7. The server of claim 1, wherein the web page presents a search entry field into which non-Arabic characters are inputtable to cause the home server to search for content.

8. The server of claim 1, wherein the home server is embodied by an IPTV.

9. System, comprising: a home server; and a control consumer electronic (CE) device, the control CE device controlling the home server using a web page served from a third party server communicating with the home server over the Internet, the web page being sourced from the home server even though the third party server cannot function as a proxy to the home server; wherein the control device contains a processor that is configured to: receiving a request for a web page from a control device; requesting over the Internet the web page from a third party server on the Internet; where the request includes information identifying the type and model number of control device requesting the web page; receiving the web page from the internet content server; sending, over a home network, the web page to a control device including a processor, display, and user input device such that the control device can display the web page to input commands to the home server, identifying itself as a web page sender to indicate to the control device that the server assembly and not the third party server is sourcing the web page, commands from the control device entered by means of the web page being returned to the server assembly such that cross-domain problems are avoided by serving the web page from the server assembly such that the control device encounters no security barriers to responding back to the server assembly, calls to the third party server being made to load the web page, in contrast to calling the third party server after the web page is already loaded; wherein the processor communicates on the Internet only with a management server and with content servers that appear on a service list provided to the processor by the management server, with the service list not being modifiable by the processor.

10. The system of claim 9, wherein the home server serves the web page to the control CE device.

11. The system of claim 10, wherein the control CE device selects the web page from a list provided by the home server, causing the home server to in turn request the web page from the third party server.

12. The system of claim 11, wherein the web page presents an image of a virtual remote control (RC) including images of RC keys that can be selected to send a command to the home server to control the home server.

13. The system of claim 12, wherein the command is configured in an infrared communication protocol.

14. The system of claim 11, wherein the web page presents entry fields for accounting information to conduct a monetary transaction for audio video content.

15. The system of claim 11, wherein the web page presents a search entry field into which non-Arabic characters are inputtable to cause the home server to search for content.

16. The system of claim 11, wherein the home server is an IPTV.

17. Server assembly comprising:
at least one processor; at least one network interface communicating with the processor to establish communication between the processor and a wide area network;
at least one computer readable storage medium accessible to the processor and bearing logic causing the processor to: receive a request for a web page from a control device; wherein the request includes information identifying the type and model number of control device requesting the web page; request over the Internet the web page from a third party server on the Internet; receive over the Internet the web page from the third party server; and serve the web page to the control device as though the server assembly originated the web page; the server assembly; sending the web page to the control device, identifying itself as a web page sender to indicate to the control device that the server assembly and not the third party server is sourcing the web page, commands from the control device entered by means of the web page being returned to the server assembly such that cross-domain problems are avoided by serving the web page from the server assembly such that the control device encounters no security barriers to responding back to the server assembly, calls to the third party server being made to load the web page, in contrast to calling the third party server after the web page is already loaded; wherein the processor communicates on the Internet only with a management server and with content servers that appear on a service list provided to the processor by the management server, with the service list not being modifiable by the processor.

18. The server assembly of claim 17, wherein along with the request for the web page to the server on the Internet, the server assembly sends identifying information pertaining to the control device.

19. The server assembly of claim 17, wherein the server assembly is embodied as an IPTV.

20. The server assembly of claim 17, wherein the server assembly sends its model number and/or type to the server on the Internet along with the request for the web page.

\* \* \* \* \*